US011100948B2

(12) United States Patent
Kawakami et al.

(10) Patent No.: US 11,100,948 B2
(45) Date of Patent: Aug. 24, 2021

(54) COATING-TYPE MAGNETIC RECORDING MEDIUM FOR HEAT-ASSISTED RECORDING, AND HEAT-ASSISTED MAGNETIC RECORDING APPARATUS AND HEAT-ASSISTED MAGNETIC RECORDING METHOD USING THE SAME

(71) Applicant: Maxell Holdings, Ltd., Kyoto (JP)

(72) Inventors: Shinji Kawakami, Kyoto (JP); Masao Fujita, Kyoto (JP); Toshio Hiroi, Kyoto (JP)

(73) Assignee: Maxell Holdings, Ltd., Kyoto (JP)

( * ) Notice: Subject to any disclaimer, the term of this patent is extended or adjusted under 35 U.S.C. 154(b) by 145 days.

(21) Appl. No.: 16/352,031

(22) Filed: Mar. 13, 2019

(65) Prior Publication Data

US 2019/0287562 A1 Sep. 19, 2019

(30) Foreign Application Priority Data

Mar. 13, 2018 (JP) .............................. JP2018-045152

(51) Int. Cl.
*G11B 5/706* (2006.01)
*G11B 11/105* (2006.01)
*G11B 5/733* (2006.01)
*G11B 5/00* (2006.01)

(52) U.S. Cl.
CPC .......... *G11B 5/70642* (2013.01); *G11B 5/733* (2013.01); *G11B 11/105* (2013.01); *G11B 11/10586* (2013.01); *G11B 2005/0021* (2013.01)

(58) Field of Classification Search
None
See application file for complete search history.

(56) References Cited

U.S. PATENT DOCUMENTS 5,741,403 A * 4/1998 Tenhover ............. G11B 5/7315
204/192.1
5,972,461 A * 10/1999 Sandstrom ............. B82Y 10/00
427/128
(Continued)

FOREIGN PATENT DOCUMENTS

JP 2007-269548 A 10/2007
JP 2007-281410 A 10/2007
(Continued)

OTHER PUBLICATIONS

Yoshikiyo, M., Namai, A., Ohkoshi, S., INTECH, 2013, chapter 8. (Year: 2013).*
(Continued)

*Primary Examiner* — Kevin M Bernatz
(74) *Attorney, Agent, or Firm* — Birch, Stewart, Kolasch & Birch, LLP (57) ABSTRACT

The magnetic recording medium disclosed in the present application includes a non-magnetic support, an undercoat layer, a magnetic layer containing magnetic particles, and a back coat layer. The coercive force Hc of the magnetic layer in the thickness direction at 25° C. is not 4100 oersteds (Oe) or more, and the coercive force Hc of the magnetic layer in the thickness direction at a temperature between 55° C. and 80° C. inclusive is not less than 1200 oersteds (Oe) and not more than 3700 oersteds (Oe).

11 Claims, 1 Drawing Sheet

(56) References Cited

U.S. PATENT DOCUMENTS

| | | | | |
|---|---|---|---|---|
| 6,146,755 | A * | 11/2000 | Guha | G11B 5/62 |
| | | | | 428/332 |
| 6,194,045 | B1 * | 2/2001 | Annacone | G11B 5/7315 |
| | | | | 360/135 |
| 10,204,651 | B2 * | 2/2019 | Nakashio | G11B 5/70621 |
| 2007/0218319 | A1 * | 9/2007 | Ohkoshi | H01F 10/007 |
| | | | | 428/836.1 |
| 2008/0057352 | A1 * | 3/2008 | Ohkoshi | G11B 5/714 |
| | | | | 428/846.7 |
| 2010/0062283 | A1 | 3/2010 | Ohkoshi | |
| 2014/0219069 | A1 * | 8/2014 | Hattori | G11B 5/73 |
| | | | | 369/13.14 |
| 2017/0221513 | A1 * | 8/2017 | Hiroi | G11B 5/70642 |
| 2018/0147626 | A1 * | 5/2018 | Shirata | B22F 1/0059 |

FOREIGN PATENT DOCUMENTS

| | | | |
|---|---|---|---|
| JP | 2008-060293 | A | 3/2008 |
| JP | 2008-128672 | A | 6/2008 |
| JP | 2011-100503 | A | 5/2011 |
| JP | 2014-154177 | A | 8/2014 |
| JP | 2014-154178 | A | 8/2014 |

OTHER PUBLICATIONS

US 2007/0218319-A1 corresponds to JP 2007-281410-A.
US 2008/0057352-A1 corresponds to JP 2008-060293-A.
US 2010/0062283-A1 corresponds to JP 2007-269548-A.
US 2014/0219069-A1 corresponds to JP 2014-154178-A.

* cited by examiner

COATING-TYPE MAGNETIC RECORDING MEDIUM FOR HEAT-ASSISTED RECORDING, AND HEAT-ASSISTED MAGNETIC RECORDING APPARATUS AND HEAT-ASSISTED MAGNETIC RECORDING METHOD USING THE SAME

BACKGROUND OF THE INVENTION

1. Field of the Invention

The present invention relates to a coating-type magnetic recording medium for heat-assisted recording, and a heat-assisted magnetic recording apparatus and heat-assisted magnetic recording method using the same.

2. Description of Related Art

As recording/reproduction methods shift from analog methods to digital methods, there is demand for further improvements in the recording density of coating-type magnetic recording media provided with a non-magnetic support and a magnetic layer containing magnetic powder and a binder formed on the non-magnetic support. Especially for high-density digital video tapes, computer backup tapes, and the like, such demand has increased year by year.

Such increases in recording density to attain a magnetic recording medium with a large capacity has led to increases in the track density of a magnetic layer. However, this poses a problem in that as the track width becomes more narrow the more the track density increases, resulting in the deterioration of output characteristics. Accordingly, there is demand for a magnetic recording medium that can exhibit excellent electromagnetic conversion characteristics even if the track density is increased following an increase in recording density.

Under these circumstances, in recent years, $\varepsilon\text{-Fe}_2\text{O}_3$ ($\varepsilon$-iron oxide) has been studied as a new magnetic material for magnetic recording media. $\varepsilon$-iron oxide can be formed into fine particles while maintaining a high coercive force, and thus is suitable for increasing the recording density. However, the coercive force of the $\varepsilon$-iron oxide is normally about 20 kOe at room temperature, and signal recording using an ordinary magnetic head is difficult.

To address this drawback, controlling the coercive force by substituting part of the Fe site of the $\varepsilon$-iron oxide with a trivalent metal of a different type has been proposed (JP 2007-269548A, JP 2007-281410A, and JP 2008-60293A). More specifically, by substituting part of the Fe site of the $\varepsilon$-iron oxide with the trivalent metal of a different type, the coercive force can be reduced to 3700 (Oe) or less, which is a coercive force with which information can be recorded using an ordinary magnetic head. However, if the coercive force is reduced to 3700 (Oe) or less by substituting part of the Fe site of the $\varepsilon$-iron oxide with a trivalent metal of a different type, the particle size distribution of the $\varepsilon$-iron oxide ceases to be sharp, and it is difficult to form fine $\varepsilon$-iron oxide particles. Furthermore, when the coercive force of the $\varepsilon$-iron oxide is reduced to 3700 (Oe) or less at room temperature, the characteristics of the $\varepsilon$-iron oxide, which naturally has a high coercive force, cannot be utilized effectively. Accordingly, it is difficult to obtain an $\varepsilon$-iron oxide suitable for increasing the recording density merely by controlling the coercive force by substituting part of the Fe site of the $\varepsilon$-iron oxide with a trivalent metal of a different type.

On the other hand, as a method of recording signals on a magnetic layer that has a high coercive force of 4000 (Oe) or more, the application of a heat-assisted recording technique, which is under consideration for utilization in hard disk drives, to a coating-type magnetic recording medium such as a magnetic tape (JP 2014-154177A and JP 2014-154178A) has been proposed. According to this heat-assisted recording technique, signal recording is performed by lowering the coercive force of the magnetic layer by applying heat at a high temperature of 100° C. or above. Because the heat-assisted recording technique requires a step of heating the magnetic layer, there is a problem in that the magnetic layer and a support film of the coating-type magnetic recording medium such as the magnetic tape may be deformed or damaged by heat. In order to solve this problem, in JP 2014-154177A and JP 2014-154178A, a heat barrier layer or a heat diffusion layer is provided between the support film and the magnetic layer.

However, in JP 2014-154177A and JP 2014-154178A, it is necessary to provide the heat barrier layer or the heat diffusion layer in addition to the non-magnetic support and the magnetic layer as necessary components for a magnetic recording medium, and there is a problem in that the number of production steps increases. Moreover, the heat-assisted recording disclosed in JP 2014-154177A and JP 2014-154178A requires a heating step performed typically at 100° C. or above, and even if the heat barrier layer or the heat diffusion layer is provided between the support film and the magnetic layer, the magnetic layer of the coating-type magnetic recording medium is locally subjected to high temperatures of 100° C. or more. Consequently, there arises a problem in that local deformation of the magnetic layer may occur and the surface properties of a surface of the magnetic layer that slides against a magnetic head deteriorates, resulting in a decrease in durability and reliability of a coating-type magnetic recording medium such as a magnetic tape.

JP 2011-100503A proposes a magnetic recording medium that has a coercive force that exhibits a temperature dependence of $-2$ to $-10$ (Oe)/° C. in a temperature range from $-50°$ C. to 100° C. However, the magnetic recording medium disclosed in JP 2011-100503A exhibits a low temperature dependence of $-2$ to $-10$ (Oe)/° C., and thus, in order to reduce the coercive force of a magnetic layer having a high coercive force of 4100 (Oe) or more at 25° C. to the extent that signal recording is possible, the magnetic recording medium needs to be heated to a high temperature, and this involves the risk that the magnetic layer and a base film of a magnetic tape will be deformed or damaged by heat. Therefore, in JP 2011-100503A, the coercive force in a vertical direction at room temperature has to be less than 4100 (Oe), and favorable electromagnetic conversion characteristics cannot be obtained when the track width is narrowed due to an increase in track density.

JP 2008-128672A, which relates to a method of measuring the thickness of a layer, is also a document relevant to the present invention.

The present invention has been made in order to solve the above-described problems, and aims to provide a magnetic recording medium that has excellent electromagnetic conversion characteristics and durability even when the track density is increased due to an increase in recording density.

SUMMARY OF THE INVENTION

The present invention provides a coating-type magnetic recording medium for heat-assisted recording, including: a non-magnetic support; and a magnetic layer containing magnetic particles, wherein a coercive force Hc of the magnetic layer in a thickness direction at 25° C. is 4100 oersteds (Oe) or more, and the coercive force Hc of the magnetic layer in the thickness direction at a temperature between 55° C. and 80° C. inclusive is not less than 1200 oersteds (Oe) and not more than 3700 oersteds (Oe).

The present invention also provides a heat-assisted magnetic recording apparatus including: the above-described coating-type magnetic recording medium according to the present invention; and a magnetic recording head for heat-assisted recording.

The present invention also provides a heat-assisted magnetic recording method including: performing heat-assisted recording by heating the above-described coating-type magnetic recording medium according to the present invention.

According to the present invention, it is possible to provide a magnetic recording medium that has excellent electromagnetic conversion characteristics and durability even when the track width is narrowed as a result of an increase in track density following an increase in recording density for achieving a large capacity.

DETAILED DESCRIPTION OF THE INVENTION

Figure 1:
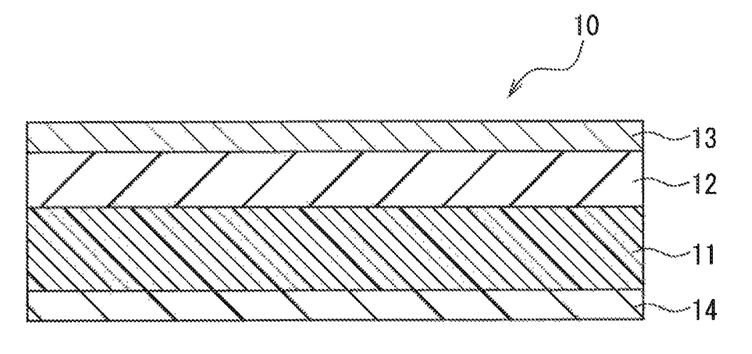
The FIGURE is a schematic sectional view showing an example of a magnetic recording medium.

Coating-Type Magnetic Recording Medium for Heat-Assisted Recording

An embodiment of a coating-type magnetic recording medium for heat-assisted recording according to the present invention will be described.

A coating-type magnetic recording medium for heat-assisted recording (also referred to simply as "magnetic recording medium" hereinafter) according to the present embodiment includes a non-magnetic support and a magnetic layer containing magnetic particles. In this coating-type magnetic recording medium, the coercive force Hc of the magnetic layer in a thickness direction at 25° C. is 4100 oersteds (Oe) or more, and the coercive force Hc of the magnetic layer in the thickness direction at a temperature between 55° C. and 80° C. inclusive is not less than 1200 oersteds (Oe) and not more than 3700 oersteds (Oe).

In the magnetic recording medium according to the present embodiment, the coercive force Hc of the magnetic layer in the thickness direction at 25° C. is 4100 oersteds (Oe) or more, and since the magnetic layer can maintain a high coercive force, the recording density of the magnetic recording medium can be increased. Also, even if the coercive force Hc is reduced by using ε-iron oxide containing an element(s) other than iron as the magnetic particles, the content of the element(s) other than iron can be reduced, and thus fine ε-iron oxide particles can be formed with the particle size distribution being sharp, and therefore the recording density of the magnetic recording medium can be increased.

In the above-described magnetic recording medium, the coercive force Hc of the magnetic layer in the thickness direction at a temperature between 55° C. and 80° C. inclusive is not less than 1200 oersteds (Oe) and not more than 3700 oersteds (Oe). Accordingly, at a low temperature below 100° C., it is possible to reduce the coercive force to 3700 (Oe) or less, which is a coercive force with which information can be recorded using an ordinary magnetic head. With this configuration, saturated recording can be performed by making the above-described magnetic layer having a high coercive force at 25° C. have an optimum coercive force through heat-assisted recording, and thus high-resolution signals can be recorded. Accordingly, it is possible to provide a magnetic recording medium that has excellent electromagnetic conversion characteristics even when the recording density is increased.

Moreover, since the above-described magnetic recording medium can perform heat-assisted recording at a low temperature between 55° C. and 80° C. inclusive, deformation and damage to the magnetic recording medium by heat can be suppressed. Accordingly, it is possible to provide a highly reliable magnetic recording medium with excellent durability.

In the magnetic recording medium of the present embodiment, the coercive force Hc of the magnetic layer in the thickness direction at 25° C. is preferably 4500 oersteds (Oe) or more, and the coercive force Hc of the magnetic layer in the thickness direction at a temperature between 60° C. and 70° C. inclusive may be set to not less than 1900 oersteds (Oe) and not more than 3500 oersteds (Oe).

Also, in the magnetic recording medium of the present embodiment, the coercive force Hc of the magnetic layer in the thickness direction at 25° C. is preferably 10,000 oersteds (Oe) or less. This is because, when the coercive force Hc of the magnetic layer in the thickness direction at 25° C. exceeds 10,000 oersteds (Oe), heat-assisted recording at a low temperature between 55° C. and 80° C. inclusive tends to be difficult.

In the magnetic recording medium of the present embodiment, in order to set the coercive force Hc of the magnetic layer in the thickness direction at 25° C. to 4100 oersteds (Oe) or more and set the coercive force Hc of the magnetic layer in the thickness direction at a temperature between 55° C. and 80° C. inclusive to not less than 1200 oersteds (Oe) and not more than 3700 oersteds (Oe), it is preferable that the magnetic particles contained in the magnetic layer are made of ε-iron oxide containing an element(s) other than iron. This is because, when the ε-iron oxide containing an element(s) other than iron is used, the coercive force at 25° C., which is room temperature, and the coercive force at a temperature between 55° C. and 80° C. inclusive, which corresponds to a low temperature heating condition, can be controlled by adjusting the content of the element(s) other than iron.

The temperature dependence of the coercive force Hc of the magnetic layer in the thickness direction is preferably −30 oersteds (Oe)/° C. or less. The temperature dependence of the coercive force Hc means the amount of change in coercive force Hc per unit temperature. With this configuration, for example, when the coercive force Hc of the magnetic layer in the thickness direction at 25° C. is 4100 oersteds (Oe), the coercive force Hc of the magnetic layer in the thickness direction at 55° C. can be set to 3600 oersteds (Oe) or less. Furthermore, even if the coercive force Hc of the magnetic layer in the thickness direction at 25° C. exceeds 4100 oersteds (Oe), the coercive force Hc of the magnetic layer in the thickness direction at a temperature between 55° C. and 80° C. inclusive can be set to not less than 1200 oersteds (Oe) and not more than 3700 oersteds (Oe) by increasing the heating temperature at the time of heat-assisted recording.

It is preferable that the coating-type magnetic recording medium further includes an undercoat layer between the non-magnetic support and the magnetic layer and that the undercoat layer is in direct contact with the magnetic layer. This is because the strength of the magnetic recording medium can be improved by including the undercoat layer, and also, by bringing the undercoat layer having a function of retaining a lubricant in direct contact with the magnetic layer, the lubricant from the undercoat layer can be supplied to the magnetic layer more easily.

In the magnetic recording medium of the present embodiment, it is preferable that recording and reproduction are performed at a surface recording density of 15 Gb/in$^2$ or more. With this configuration, it is possible to provide a magnetic recording medium that has a large capacity.

Preferably, the magnetic recording medium of the present embodiment has an overall thickness of 5.0 μm or less. With this configuration, it is possible to provide a magnetic recording medium that has a large volumetric capacity density. On the other hand, when the magnetic recording medium has a small overall thickness of 5.0 μm or less, the durability of the magnetic recording medium deteriorates to some extent. However, since heat-assisted recording to the magnetic recording medium can be performed at a low heating temperature between 55° C. and 80° C. inclusive, considerable deterioration in durability can be prevented from occurring.

The magnetic recording medium of the present embodiment will be described with reference to the drawing. The FIGURE is a schematic sectional view showing an example of the magnetic recording medium of the present embodiment.

In the FIGURE, a magnetic recording medium 10 of the present embodiment is a magnetic tape that includes a non-magnetic support 11, an undercoat layer 12 formed on one principal surface of the non-magnetic support 11, and a magnetic layer 13 formed on a principal surface of the undercoat layer 12 on a side opposite to the non-magnetic support 11 side. On a principal surface of the non-magnetic support 11 on which the undercoat layer 12 is not formed, a back coat layer 14 is formed.

Magnetic Layer

The magnetic layer 13 contains magnetic particles and a binder. Preferably, the magnetic particles are composed of ε-iron oxide containing an element(s) other than iron (also referred to simply as "ε-iron oxide" hereinafter).

By using the magnetic particles composed of the ε-iron oxide containing an element(s) other than iron and adjusting the content of the element(s) other than iron as appropriate, the coercive force Hc of the magnetic layer in the thickness direction at 25° C. can be set to 4100 oersteds (Oe) or more and the coercive force Hc of the magnetic layer in the thickness direction at a temperature between 55° C. and 80° C. inclusive can be set to not less than 1200 oersteds (Oe) and not more than 3700 oersteds (Oe). The reason for this is considered to be that the content of the element(s) other than iron in the ε-iron oxide affects the coercive force of the ε-iron oxide at 25° C. and the temperature dependence of the coercive force.

In order to set the coercive force Hc of the magnetic layer in the thickness direction at 25° C. to 4100 oersteds (Oe) or more and set the coercive force Hc of the magnetic layer in the thickness direction at a temperature between 55° C. and 80° C. inclusive to not less than 1200 oersteds (Oe) and not more than 3700 oersteds (Oe), the balance between the temperature dependence of the coercive force of the ε-iron oxide and the coercive force of the ε-iron oxide at 25° C. is important. This is because, even if the temperature dependence of the coercive force of the ε-iron oxide is large, it is difficult to set the coercive force of the ε-iron oxide at a temperature between 55° C. and 80° C. inclusive to not less than 1200 oersteds (Oe) and not more than 3700 oersteds (Oe) if the coercive force of the ε-iron oxide at 25° C. is too high. Thus, the coercive force of the ε-iron oxide at 25° C. is typically set to 10,000 oersteds (Oe) or less in light of balance with the temperature dependence of the coercive force of the ε-iron oxide.

Preferably, the ε-iron oxide containing an element(s) other than iron is formed in a single phase represented by the general composition formula $\varepsilon\text{-}M_xFe_{2-x}O_3$. This is because the coercive force of the magnetic layer is reduced if α-iron oxide or γ-iron oxide is also contained. It is to be noted, however, that α-iron oxide and γ-iron oxide may be contained as impurities as long as the coercive force of the magnetic layer is not reduced. In the present embodiment, the ε-iron oxide can be distinguished from other iron oxides such as α-iron oxide and γ-iron oxide by analyzing the crystal structures of these iron oxides through X-ray diffraction.

In the general composition formula $\varepsilon\text{-}M_xFe_{2-x}O_3$, M represents, for example, one or more elements other than iron (Fe), such as gallium (Ga), cobalt (Co), titanium (Ti), aluminum (Al), rhodium (Rh), and indium (In). The optimum value of x varies depending on the type of M and the molar ratio between M and Fe. When the molar ratio between M and Fe is represented by $x/(2-x)$, it is preferable that, for example: $0.4 \leq x/(2-x) \leq 0.9$ is satisfied in the case where M is Ga; $0.1 \leq x/(2-x) \leq 0.18$ is satisfied in the case where M is Ti, Co, or Al; and $0.1 \leq x/(2-x) \leq 0.30$ is satisfied in the case where M is Ti, Co, or Ga. When $x/(2-x)$ is in the above-described range, the coercive force Hc of the magnetic layer in the thickness direction at 25° C. can be set to 4100 oersteds (Oe) or more and the coercive force Hc of the magnetic layer in the thickness direction at a temperature between 55° C. and 80° C. inclusive can be set to not less than 1200 oersteds (Oe) and not more than 3700 oersteds (Oe).

When M is an element other than Ga, Co, Ti, and Al, the range of $x/(2-x)$ can be determined through limited experimentation.

The ε-iron oxide is typically composed of spherical particles. However, the shape of the particles is not limited to spherical shapes, and may be substantially spherical or ellipsoidal.

The magnetic particles composed of the ε-iron oxide preferably have an average particle size of 17 nm or less so as to be more compatible with short wavelength recording. The lower limit value of the average particle size of the magnetic particles composed of the ε-iron oxide is typically about 8 nm. This is because ε-iron oxide with an average particle size of less than 8 nm cannot be produced easily.

In the present embodiment, the average particle size of the magnetic particles contained in the magnetic layer is determined in the following manner using 100 magnetic particles in one field of view in a photograph obtained by imaging the surface of the magnetic layer using a scanning electron microscope (SEM) "S-4800" manufactured by HITACHI Ltd. with an acceleration voltage of 2 kV and at a magnification of 10000 times (10k times) under observation conditions of U-LA100.

When the above-described particles are needle-like particles, the average particle size is determined by calculating an average major axis diameter of 100 particles. When the above-described particles are plate-like particles, the average particle size is determined by calculating an average maximum plate diameter of 100 particles. When the above-described particles are spherical or ellipsoidal particles with a ratio of the major axis length to the minor axis length being from 1 to 3.5, the average particle size is determined by calculating an average maximum diameter of 100 particles.

It is preferable that the thickness of the magnetic layer is not less than 30 nm and not more than 200 nm. By setting the thickness of the magnetic layer to 200 nm or less, short wavelength recording characteristics can be improved. By setting the thickness of the magnetic layer to 30 nm or more, servo signals can be recorded. When ε-iron oxide particles are used as the magnetic particles of the present embodiment, the saturation magnetization amount of the ε-iron oxide particles is small and corresponds to ½ to ⅓ of the saturation magnetization amount of conventional ferromagnetic hexagonal ferrite particles. Accordingly, in the case of recording a servo signal with a long recording wavelength, it is necessary that the magnetic layer has a thickness of 30 nm or more.

Also in the case where a timing servo signal with a recording wavelength of 1 μm or longer is to be recorded on the magnetic layer, the above-described heat-assisted recording allows the servo signal to be recorded using a low recording current. Accordingly, distortion of recording signal pulses can be reduced, and it is possible to record a servo signal with a sharper rising edge of a pulse. As a result, the servo tracking accuracy is improved, whereby it is possible to obtain a highly reliable magnetic recording medium that exhibits a favorable error rate at high recording density.

The method for measuring the average thickness of the magnetic layer is not particularly limited. For example, the method described in JP 2008-128672A may be used.

As the binder contained in the magnetic layer 13, a conventionally known thermoplastic resin, thermosetting resin, or the like can be used. Specific examples of the thermoplastic resin include vinyl chloride resins, vinyl chloride-vinyl acetate copolymer resins, vinyl chloride-vinyl alcohol copolymer resins, vinyl chloride-vinyl acetate-vinyl alcohol copolymer resins, vinyl chloride-vinyl acetate-maleic anhydride copolymer resins, vinyl chloride-hydroxy group-containing alkyl acrylate copolymer resins, and polyester polyurethane resins. Specific examples of the thermosetting resin include phenolic resins, epoxy resins, polyurethane resins, urea resins, melamine resins, and alkyd resins. The content of the binder in the magnetic layer 13 is preferably from 7 to 50 parts by mass, and more preferably from 10 to 35 parts by mass, with respect to 100 parts by mass of the magnetic particles.

It is preferable to use, in combination with the binder, a thermosetting crosslinking agent that forms a crosslinked structure by binding with a functional group or the like contained in the binder. Specific examples of the crosslinking agent include: isocyanate compounds such as tolylene diisocyanate, hexamethylene diisocyanate, and isophorone diisocyanate; reaction products obtained by reacting an isocyanate compound with a compound having a plurality of hydroxyl groups, such as trimethylolpropane; and various polyisocyanates such as condensation products of isocyanate compounds. The content of the crosslinking agent is preferably from 10 to 50 parts by mass with respect to 100 parts by mass of the binder.

As long as the magnetic layer 13 contains the above-described magnetic particles and binder, the magnetic layer 13 may further contain an additive(s) such as an abrasive, a lubricant, and a dispersant. In particular, the abrasive and lubricant are preferably used from the viewpoint of durability.

Specific examples of the abrasive include α-alumina, β-alumina, silicon carbide, chromium oxide, cerium oxide, α-iron oxide, corundum, artificial diamond, silicon nitride, titanium carbide, titanium oxide, silicon dioxide, and boron nitride. Out of these, abrasives with a Mohs hardness of at least 6 are more preferable. One of these abrasives may be used alone, or two or more of these abrasives may be used in combination. The average particle size of the abrasive, which varies depending on the type of abrasive to be used, is preferably from 10 to 200 nm. The content of the abrasive is preferably from 5 to 20 parts by mass, more preferably from 8 to 18 parts by mass, with respect to 100 parts by mass of the magnetic particles.

The lubricant may be a fatty acid, a fatty acid ester, or a fatty acid amide. The fatty acid may be any of a straight-chain fatty acid, a branched fatty acid, and a cis-trans isomer. Out of these, the straight-chain fatty acid is preferable in terms of its high lubrication performance. Specific examples of such a fatty acid include lauric acid, myristic acid, stearic acid, palmitic acid, behenic acid, oleic acid, and linoleic acid. Specific examples of the fatty acid ester include n-butyl oleate, hexyl oleate, n-octyl oleate, 2-ethylhexyl oleate, oleyl oleate, n-butyl laurate, heptyl laurate, n-butyl myristate, n-butoxyethyl oleate, trimethylolpropane trioleate, n-butyl stearate, s-butyl stearate, isoamyl stearate, and butyl cellosolve stearate. Specific examples of the fatty acid amide include palmitic acid amide and stearic acid amide. One of these lubricants may be used alone, or two or more of these lubricants may be used in combination.

Out of these, it is preferable to use the fatty acid ester and the fatty acid amide in combination. In particular, it is preferable to use 0.2 to 3 parts by mass of the fatty acid ester and 0.5 to 5 parts by mass of the fatty acid amide with respect to 100 parts by mass of the total solid content including the magnetic particles and the abrasive in the magnetic layer 13. The fatty acid ester content in the above-described range is preferable because, when the fatty acid ester content is less than 0.2 parts by mass, an effect of reducing the coefficient of friction is small, and when the fatty acid ester content exceeds 3.0 parts by mass, side effects such as the magnetic layer 13 adhering to a magnetic head may occur. The fatty acid amide content in the above-described range is preferable because, when the fatty acid amide content is less than 0.5 parts by mass, an effect of preventing seizing caused by contact between the magnetic head and the magnetic layer 13 is small, and when the fatty acid amide content is more than 5 parts by mass %, the fatty acid amide may bleed out.

The magnetic layer 13 may contain carbon black in order to improve the conductivity and surface lubricity. Specific examples of such carbon black include acetylene black, furnace black, and thermal black. The average particle size of the carbon black is preferably from 0.01 to 0.1 μm. When the average particle size is 0.01 μm or more, it is possible to form a magnetic layer 13 in which particles of the carbon black are well dispersed. On the other hand, when the average particle size is 0.1 μm or less, it is possible to form a magnetic layer 13 with excellent surface lubricity. Two or more types of carbon black with different average particle sizes may be used, when necessary. The content of the carbon black is preferably from 0.2 to 5 parts by mass, and more preferably from 0.5 to 4 parts by mass, with respect to 100 parts by mass of the magnetic particles.

The magnetic layer 13 preferably has a surface roughness of less than 2.0 nm. The surface roughness is a centerline average roughness Ra defined in the Japanese Industrial Standard (JIS) B0601. Although output is increased the more surface lubricity of the magnetic layer 13 is improved, an excessively smooth surface of the magnetic layer 13 leads to an increase in the coefficient of friction, which in turn reduces the running stability. Thus, it is preferable that Ra is 1.0 nm or more.

Lubricant Layer

In order to reduce the coefficient of friction of the magnetic layer 13 and further improve the durability of the magnetic layer 13, it is preferable to provide a lubricant layer containing a fluorine-based lubricant or a silicone-based lubricant on the magnetic layer 13, although the lubricant layer is not shown in the FIGURE. Examples of the fluorine-based lubricant include trichlorofluoroethylene, perfluoropolyether, perfluoroalkylpolyether, and perfluoroalkyl carboxylic acid. Examples of the silicone-based lubricant include silicone oil and modified silicone oil. One of these lubricants may be used alone, or two or more of these lubricants may be used in combination. More specifically, the fluorine-based lubricant may be, for example, "Novec 7100" or "Novec 1720" (trade name) manufactured by 3M Company, and the silicone-based lubricant maybe, for example, "KF-96L", "KF-96A", "KF-96", "KF-96H", "KF-99", "KF-50", "KF-54", "KF-965", "KF-968", "HIVAC F-4", "HIVAC F-5", "KF-56A", "KF995", "KF-69", "KF-410", "KF-412", "KF-414", or "FL" (trade name) manufactured by Shin-Etsu Shilicone Co., Ltd. or "BY16-846", "SF8416", "SH200", "SH203", "SH230", "SF8419", "FS1265", "SH510", "SH550", "SH710", "FZ-2110", or "FZ-2203" (trade name) manufactured by Dow Corning Toray Co., Ltd.

The lubricant layer can be formed by top-coating the magnetic layer 13 with the lubricant. As described above, the magnetic layer 13 is uniformly filled with fine magnetic particles, and the lubricant contained in the magnetic layer 13 cannot easily move to the surface of the magnetic layer 13. However, by applying the lubricant to the surface of the magnetic layer to achieve a top-coating, a lubricant layer can be reliably formed on the surface of the magnetic layer 13.

Undercoat Layer

It is preferable to provide the undercoat layer 12 having a function of retaining a lubricant and a function of absorbing external stress (e.g., a pressing force applied by a magnetic head), under the magnetic layer 13. The strength of the magnetic recording medium 10 is improved as a result of providing the undercoat layer 12. Accordingly, calendering can be performed when forming the magnetic recording medium 10, and the fillability of the magnetic layer 13 can be improved. The undercoat layer 12 contains a non-magnetic powder, a binder, and a lubricant.

Examples of the non-magnetic powder contained in the undercoat layer 12 include carbon black, titanium oxide, iron oxide, and aluminum oxide. Typically, carbon black is used alone, or a mixture of carbon black with another non-magnetic powder such as titanium oxide, iron oxide, or aluminum oxide is used. In order to form a coating with little unevenness in its thickness to form a smooth undercoat layer 12, it is preferable to use a non-magnetic powder with sharp particle size distribution. It is preferable that the average particle size of the non-magnetic powder is, for example, from 10 to 1000 nm, and more preferably from 10 to 500 nm, from the viewpoint of ensuring the uniformity, surface smoothness, and rigidity of the undercoat layer 12 and ensuring the conductivity.

The particle shape of the non-magnetic powder contained in the undercoat layer 12 may be any of spherical, plate-like, needle-like, and spindle-like shapes. The average particle size of the needle-like or spindle-like non-magnetic powder is preferably such that the average major axis diameter is from 10 to 300 nm and the average minor axis diameter is from 5 to 200 nm. The average particle size of the spherical non-magnetic powder is preferably from 5 to 200 nm, and more preferably from 5 to 100 nm. The average particle size of the plate-like non-magnetic powder is preferably such that the largest plate diameter is from 10 to 200 nm. Furthermore, in order to form the undercoat layer 12 that is smooth and has little unevenness in its thickness, a non-magnetic powder with sharp particle size distribution is preferably used.

Examples of the binder and the lubricant contained in the undercoat layer 12 include those described above as the examples of the binder and the lubricant for use in the magnetic layer 13. The content of the binder is preferably from 7 to 50 parts by mass, and more preferably from 10 to 35 parts by mass, with respect to 100 parts by mass of the non-magnetic powder. The content of the lubricant is preferably from 2 to 6 parts by mass, and more preferably from 2.5 to 4 parts by mass, with respect to 100 parts by mass of the non-magnetic powder.

In the case where ε-iron oxide particles are used as the above-described magnetic particles in the magnetic layer 13, the saturation magnetization amount of the ε-iron oxide particles is small and corresponds to ½ to ⅓ of the saturation magnetization amount of conventional ferromagnetic hexagonal ferrite particles. Accordingly, in the case of recording a servo signal with a long recording wavelength, it is preferable that magnetic particles are contained in the undercoat layer 12. As the magnetic particles to be contained in the undercoat layer 12, metallic iron-based magnetic particles with a needle-like shape, hexagonal ferrite magnetic particles with a plate-like shape, iron nitride-based magnetic particles with a granular shape, or the like, can be used, for example.

The thickness of the undercoat layer 12 is preferably from 0.1 to 3 μm, and more preferably from 0.3 to 2 μm. By setting the thickness of the undercoat layer 12 in this range, the function of retaining a lubricant and the function of absorbing external stress can be maintained without unnecessarily increasing the overall thickness of the magnetic recording medium 10.

Non-Magnetic Support

As the non-magnetic support 11, it is possible to use a conventionally used non-magnetic support for use in magnetic recording media. Specific examples of the non-magnetic support include films formed of polyesters such as polyethylene terephthalate and polyethylene naphthalate, polyolefins, cellulose triacetate, polycarbonate, polyamide, polyimide, polyamide-imide, polysulfone, and aramid.

The thickness of the non-magnetic support 11, which varies depending on the intended use of the non-magnetic support 11, is preferably from 1.5 to 11 μm, and more preferably from 2 to 7 μm. When the non-magnetic support 11 has a thickness of 1.5 μm or more, the film formability is improved and high strength can be obtained. On the other hand, when the non-magnetic support 11 has a thickness of 11 μm or less, an unnecessary increase in the overall thickness is avoided, and, for example, in the case of a magnetic tape, the recording capacity per reel can be increased.

The Young's modulus of the non-magnetic support 11 in the longitudinal direction is preferably 5.8 GPa or more, and more preferably 7.1 GPa or more. When the Young's modulus of the non-magnetic support 11 in the longitudinal direction is 5.8 GPa or more, the running characteristics can be improved. Moreover, in the case of a magnetic recording medium for use in helical scan, the ratio (MD/TD) of the Young's modulus (MD) in the longitudinal direction to the Young's modulus (TD) in the width direction is preferably from 0.6 to 0.8, more preferably from 0.65 to 0.75, and still more preferably 0.7. When the ratio is in the above-described range, it is possible to suppress variation (flatness) in output between a magnetic head entrance side and a magnetic head exit side of a track. In the case of a magnetic recording medium for use in linear recording, the ratio (MD/TD) of the Young's modulus (MD) in the longitudinal direction to the Young's modulus (TD) in the width direction is preferably from 0.7 to 1.3.

Back Coat Layer

On a principal surface of the non-magnetic support 11 opposite to the principal surface on which the undercoat layer 12 is formed, the back coat layer 14 is preferably provided for the purpose of, for example, improving the running characteristics. The back coat layer 14 preferably has a thickness from 0.2 to 0.8 µm, and more preferably from 0.3 to 0.8 µm. If the back coat layer 14 is too thin, it cannot exhibit an effect of sufficiently improving the running characteristics. If the back coat layer 14 is too thick, the overall thickness of the magnetic recording medium 10 increases, and this results in a decrease in the recording capacity per reel of magnetic tape, for example.

Preferably, the back coat layer 14 contains carbon black such as acetylene black, furnace black, or thermal black, for example. Typically, carbon blacks having relatively different particle diameters, namely, carbon black with a small particle diameter and carbon black with a large particle diameter, are used in combination. The reason as to why they are used in combination is that an effect of improving the running characteristics is enhanced.

Furthermore, the back coat layer 14 contains a binder. Examples of the binder include those described above as the examples of the binder for use in the magnetic layer 13 and the undercoat layer 12. Out of them, it is preferable to use a cellulose resin and a polyurethane resin in combination in order to reduce the coefficient of friction and improve the running characteristics with respect to a magnetic head.

Preferably, the back coat layer 14 further contains iron oxide, alumina, or the like in order to improve the strength.

Next, a method for producing the magnetic recording medium of the present embodiment will be described. The method for producing the magnetic recording medium of the present embodiment is as follows, for example. First, a coating material for magnetic layer formation, a coating material for undercoat layer formation, and a coating material for back coat layer formation are prepared by mixing the components for forming the respective layers with solvents. Then, a magnetic layer is formed using a sequential multilayer coating method in which the coating material for undercoat layer formation is applied to one surface of a non-magnetic support and dried to form an undercoat layer and thereafter the coating material for magnetic layer formation is applied to the thus-formed undercoat layer and dried. Further, the coating material for back coat layer formation is applied to the other surface of the non-magnetic support and dried to form a back coat layer. Thereafter, the thus-obtained laminate is subjected to calendering as a whole, and a magnetic recording medium is obtained Also, instead of the above-described sequential multilayer coating method, it is also possible to employ a simultaneous multilayer coating method performed by applying the coating material for undercoat layer formation to one side of the non-magnetic support body, then applying the coating material for magnetic layer formation onto the coating material for undercoat layer formation before the coating material for undercoat layer formation is dried, and drying the coating material for magnetic layer formation.

The method for applying each of the above-described respective coating materials is not particularly limited. For example, gravure coating, roll coating, blade coating, extrusion coating, or the like can be used.

Heat-Assisted Magnetic Recording Apparatus

Next, an embodiment of a heat-assisted magnetic recording apparatus according to the present invention will be described.

The heat-assisted magnetic recording apparatus of the present embodiment includes the coating-type magnetic recording medium for heat-assisted recording according to the above-described embodiment and a magnetic recording head for a heat-assisted recording medium. By using the above-described coating-type magnetic recording medium for heat-assisted recording in combination with the magnetic recording head for heat-assisted recording, heat-assisted recording is enabled as described above, and thus, a magnetic recording medium with excellent electromagnetic conversion characteristics and durability can be provided.

The magnetic recording head for heat-assisted recording is a magnetic recording head that can record magnetic signals on a magnetic layer by applying a recording magnetic field to a recording portion of the magnetic layer while locally heating the recording portion. In the present embodiment, a specific configuration of the above-described magnetic recording head for heat-assisted recording is not particularly limited as long as it can heat the recording portion to a temperature between 55° C. and 80° C. inclusive.

Heat-Assisted Magnetic Recording Method

Next, an embodiment of a heat-assisted magnetic recording method according to the present invention will be described.

The heat-assisted magnetic recording method of the present embodiment includes performing heat-assisted recording by heating the coating-type magnetic recording medium for heat-assisted recording according to the above-described embodiment. The heating temperature is preferably between 55° C. and 80° C. inclusive. According to this method, the coercive force Hc of the magnetic layer in the thickness direction at a temperature between 55° C. and 80° C. inclusive can be set to not less than 1200 oersteds (Oe) and not more than 3700 oersteds (Oe), whereby a magnetic recording medium with excellent electromagnetic conversion characteristics and durability can be provided. Alternatively, the heating temperature may be between 60° C. and 70° C. inclusive.

The heating method is not particularly limited. For example, a magnetic recording head for heat-assisted recording provided with a heating mechanism may be used, or a method of heating the inside of a drive to a temperature between 55° C. and 80° C. inclusive at the time of recording may be employed. According to the method of heating the inside of the drive at the time of recording, recording can be performed using an ordinary magnetic recording head instead of a magnetic recording head for heat-assisted recording.

The recording portion of the magnetic layer in the coating-type magnetic recording medium also may be heated to a temperature between 60° C. and 70° C. inclusive.

The present invention will be described below with reference to examples, but the present invention is not limited to the following examples. The term "part" used in the following description means "part by mass".

EXAMPLE 1

Preparation of Magnetic Coating Material

Magnetic coating material components (1) shown in Table 1 were mixed together at high speed using a high-speed stirring mixer to prepare a mixture. Next, the thus-obtained mixture was dispersed in a sand mill for 250 minutes. Thereafter, magnetic coating material components (2) shown in Table 2 were added thereto to prepare a dispersion liquid. Subsequently, the thus-obtained dispersion liquid and magnetic coating material components (3) shown in Table 3 were stirred with a disperser, and the resultant mixture was filtered through a filter to prepare a magnetic coating material.

TABLE 1

| Magnetic coating material components (1) | Part |
|---|---|
| Magnetic powder (A) Composition: $\varepsilon$-Ga$_{0.7}$Fe$_{1.3}$O$_3$, Average particle size: 16.9 nm, Hc (25° C.): 6160 (Oe), Hc temperature dependence: −61 (Oe/° C.), Curie temperature: 111° C. | 100 |
| Vinyl chloride-based copolymer (containing —SO$_3$K group) | 13.5 |
| Polyurethane resin (containing —SO$_3$Na group, glass transition temperature: 70° C.) | 8 |
| Carbon black (Average particle size: 75 nm) | 2 |
| Granular alumina powder (Average particle size: 80 nm) | 8 |
| Cyclohexanone | 120 |
| Toluene | 120 |

TABLE 2

| Magnetic coating material components (2) | Part |
|---|---|
| n-Butyl stearate | 1 |
| Cyclohexanone | 100 |
| Methyl ethyl ketone | 100 |
| Toluene | 100 |

TABLE 3

| Magnetic coating material components (3) | Part |
|---|---|
| Polyisocyanate | 3.5 |
| Cyclohexanone | 7 |
| Toluene | 7 |

Preparation of Undercoating Material

Undercoating material components (1) shown in Table 4 were kneaded using a batch-type kneader to prepare a kneaded product. Next, the thus-obtained kneaded product and undercoating material components (2) shown in Table 5 were stirred using a disperser to prepare a liquid mixture. Subsequently, the thus-obtained liquid mixture was dispersed in a sand mill for 100 minutes to prepare a dispersion liquid. Thereafter, this dispersion liquid and undercoating material components (3) shown in Table 6 were stirred using a disperser, and the resultant mixture was filtered through a filter to prepare an undercoating material.

TABLE 4

| Undercoating material components (1) | Part |
|---|---|
| Needle-like iron oxide (Average major axis length: 110 nm) | 79 |
| Carbon black (Average particle size: 17 nm) | 18 |
| Granular alumina powder (Average particle size: 140 nm) | 3 |
| Vinyl chloride-hydroxypropyl acrylate copolymer (containing —SO$_3$Na group) | 9 |
| Polyurethane resin (containing —SO$_3$Na group, glass transition temperature: 20° C.) | 7.5 |
| Cyclohexanone | 120 |
| Methyl ethyl ketone | 60 |
| Toluene | 60 |

TABLE 5

| Undercoating material components (2) | Part |
|---|---|
| Stearic acid | 1 |
| n-Butyl stearate | 1.5 |
| Cyclohexanone | 120 |
| Toluene | 120 |

TABLE 6

| Undercoating material components (3) | Part |
|---|---|
| Polyisocyanate | 4.5 |
| Cyclohexanone | 7 |
| Toluene | 7 |

Preparation of Coating Material for Back Coat Layer

A liquid mixture obtained by mixing coating material components for a back coat layer shown in Table 7 was dispersed in a sand mill for 50 minutes so as to prepare a dispersion liquid. 15 parts of polyisocyanate was added to the thus-obtained dispersion liquid, and the resultant mixture was stirred and then filtered through a filter. Thus, a coating material for a back coat layer was prepared.

TABLE 7

| Coating material components for back coat layer | Part |
|---|---|
| Carbon black (Average particle size: 25 nm) | 80 |
| Carbon black (Average particle size: 300 nm) | 10 |
| α-hematite powder (Average particle size: 100 nm) | 10 |
| Nitrocellulose | 45 |
| Polyurethane resin (containing —SO$_3$Na group, glass transition temperature: 20° C.) | 30 |
| Cyclohexanone | 300 |
| Methyl ethyl ketone | 500 |
| Toluene | 500 |

Production of Magnetic Tape for Evaluation

An undercoat layer was formed by applying the above-described undercoating material onto a non-magnetic support (aramid film, thickness: 3.6 μm) in such a manner that the thickness of the undercoat layer after calendering was 0.9 μm, and drying the undercoating material at 100° C.

Next, a magnetic layer was formed by applying the above-described magnetic coating material onto the above-described undercoat layer in such a manner that the thickness of the magnetic layer after calendering was 55 nm, and drying the magnetic coating material at 100° C. During the drying step, vertical orientation processing was performed while applying an oriented magnetic field with a magnetic field strength of 450 kA/m in the vertical direction using N-S opposing magnets.

Next, a back coat layer was formed by applying the coating material for the back coat layer onto the surface of the non-magnetic support opposite to the surface on which the undercoat layer and the magnetic layer were formed in such a manner that the thickness of the back coat layer after calendering was 0.4 µm, and drying the coating material for the back coat layer at 100° C.

Thereafter, a web roll obtained by forming the undercoat layer and the magnetic layer on the upper surface side of the non-magnetic support and forming the back coat layer on the lower surface side of the non-magnetic support was subjected to calendering at a temperature of 100° C. and under a linear pressure of 300 kg/cm using a calendering apparatus provided with seven metal rollers.

Finally, a magnetic sheet was produced by subjecting the thus-obtained web roll to hardening at 60° C. for 48 hours. This magnetic sheet was cut so as to have a width of ½ an inch. Thus, a magnetic tape for evaluation according to Example 1 was produced.

EXAMPLE 2

A magnetic tape for evaluation according to Example 2 was produced in the same manner as in Example 1, except that the following magnetic powder (B) was used instead of the magnetic powder (A) in the magnetic coating material components (1) shown in Table 1.
Magnetic powder (B) Composition: $\varepsilon\text{-}Ga_{0.9}Fe_{1.1}O_3$, Average particle size: 16.7 nm, Hc (25° C.): 5520 (Oe), Hc temperature dependence: −64 (Oe/° C.), Curie temperature: 102° C.

EXAMPLE 3

A magnetic tape for evaluation according to Example 3 was produced in the same manner as in Example 1, except that the following magnetic powder (C) was used instead of the magnetic powder (A) in the magnetic coating material components (1) shown in Table 1.
Magnetic powder (C) Composition: $\varepsilon\text{-}Ga_{0.63}Fe_{1.37}O_3$, Average particle size: 17.5 nm, Hc (25° C.): 6030 (Oe), Hc temperature dependence: −56 (Oe/° C.), Curie temperature: 120° C.

EXAMPLE 4

A magnetic tape for evaluation according to Example 4 was produced in the same manner as in Example 1, except that the following magnetic powder (D) was used instead of the magnetic powder (A) in the magnetic coating material components (1) shown in Table 1.
Magnetic powder (D) Composition: $\varepsilon\text{-}Ti_{0.04}Co_{0.03}Al_{0.21}Fe_{1.72}O_3$, Average particle size: 16.3 nm, Hc (25° C.): 4770 (Oe), Hc temperature dependence: −36 (Oe/° C.), Curie temperature: 151° C.

EXAMPLE 5

A magnetic tape for evaluation according to Example 5 was produced in the same manner as in Example 1, except that the following magnetic powder (E) was used instead of the magnetic powder (A) in the magnetic coating material components (1) shown in Table 1.
Magnetic powder (E) Composition: $\varepsilon\text{-}Ti_{0.06}Co_{0.05}Ga_{0.24}Fe_{1.65}O_3$, Average particle size: 16.5 nm, Hc (25° C.): 4410 (Oe), Hc temperature dependence: −32 (Oe/° C.), Curie temperature: 146° C.

Comparative Example 1

A magnetic tape for evaluation according to Comparative Example 1 was produced in the same manner as in Example 1, except that the following magnetic powder (F) was used instead of the magnetic powder (A) in the magnetic coating material components (1) shown in Table 1.
Magnetic powder (F) Composition: $\varepsilon\text{-}Ga_{1.0}Fe_{1.0}O_3$, Average particle size: 17.1 nm, Hc (25° C.): 5010 (Oe), Hc temperature dependence: −68 (Oe/° C.), Curie temperature: 95° C.

Comparative Example 2

A magnetic tape for evaluation according to Comparative Example 2 was produced in the same manner as in Example 1, except that the following magnetic powder (G) was used instead of the magnetic powder (A) in the magnetic coating material components (1) shown in Table 1.
Magnetic powder (G) Composition: $\varepsilon\text{-}Ti_{0.05}Co_{0.05}Al_{0.22}Fe_{1.68}O_3$, Average particle size: 16.8 nm, Hc (25° C.): 4670 (Oe), Hc temperature dependence: −19 (Oe/° C.), Curie temperature: 263° C.

Comparative Example 3

A magnetic tape for evaluation according to Comparative Example 3 was produced in the same manner as in Example 1, except that the following magnetic powder (H) was used instead of the magnetic powder (A) in the magnetic coating material components (1) shown in Table 1.
Magnetic powder (H) Composition: $\varepsilon\text{-}Ti_{0.06}Co_{0.07}Al_{0.22}Fe_{1.65}O_3$, Average particle size: 17.2 nm, Hc (25° C.): 4150 (Oe), Hc temperature dependence: −30 (Oe/° C.), Curie temperature: 155° C.

Coercive Forces and Temperature Dependences of Magnetic Powder and Magnetic Layer Using a truly cryogen-free physical property measuring device "PPMS Dyna Cool" (product name, applied magnetic field: 5T, sweep speed: 40 Oe/sec) manufactured by Quantum Design Japan, Inc., coercive forces Hc of the magnetic powder and the magnetic layer at respective temperatures and the temperature dependences of the coercive forces Hc were measured, and the Curie temperature of the magnetic powder was also measured. The temperature dependences of the coercive forces Hc were determined as the inclination (Oe/° C.) of the approximation straight lines calculated by the least-squares method using the values of the coercive forces Hc at 0° C., 25° C., 45° C., and 60° C. The coercive force of the magnetic layer was measured as a coercive force Hc in the thickness direction of the magnetic layer.

Output Characteristics

An apparatus for measuring electromagnetic conversion characteristics of a linear tape was produced by modifying an LTO drive, and an inductive/GMR composite magnetic head with a writing track width of 5 µm and a readout track width of 2.3 µm was attached to this apparatus. Using this apparatus, evaluation was made by recording a signal having a recording wavelength of 200 nm (linear recording density of G7×1.05) to each of the magnetic tapes for evaluation at a tape speed of 1.5 m/sec while being heat-assisted in an atmosphere at 60° C.

Next, the signal was reproduced by causing the magnetic tape for evaluation to run again, and the reproduced signal was amplified using a commercially available read amplifier for an MR head. Thereafter, using a spectrum analyzer "N9020A" (product name) manufactured by Keysight Technologies, a fundamental wave component output (S) of the signal and integral noise (N) up to twice the frequency thereof were measured. The S/N ratio of Comparative Example 2 was set to a reference value (0 dB), and the S/N ratios of other examples and comparative examples were expressed as relative values (dB) with respect to the S/N ratio of Comparative Example 2.

Accelerated Life Testing

Accelerated life testing was performed by storing each magnetic tape for evaluation in an environment at a temperature of 50° C. and a relative humidity of 80% for 90 days. Then, the S/N ratio was measured before and after the accelerated life testing in the same manner as in the above-described measurement of the output characteristics, and the value obtained by subtracting the S/N ratio before the accelerated life testing from the S/N ratio after the accelerated life testing was determined.

The results of the above-described evaluations are shown in Tables 8 and 9. Table 8 shows the type of magnetic powder, the molar ratio x/(2−x) between an additive element M other than iron and Fe, and the coercive forces Hc of the magnetic layer at the respective temperatures. Table 9 shows the temperature dependence of the coercive force of the magnetic layer, the output characteristics, and the difference in S/N ratio before and after the accelerated life testing.

From Table 9, it can be seen that the magnetic tapes for evaluation according to Examples 1 to 5 exhibited higher output characteristics (S/N ratios) and/or superiority in durability than the magnetic tapes for evaluation according to Comparative Examples 1 to 3. In contrast, it can be seen that the magnetic tape for evaluation according to Comparative Example 2 in which Hc at 55° C. was higher than 3700 (Oe) and the magnetic tape for evaluation according to Comparative Example 3 in which Hc at 25° C. was lower than 4100 oersteds (Oe) exhibited low output characteristics (S/N ratio). Moreover, it also can be seen that, in the magnetic tape for evaluation according to Comparative Example 1 in which Hc at 80° C. was lower than 1200 (Oe), the difference in S/N ratio before and after the accelerated life testing was great, and the magnetic tape was inferior in terms of durability.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A coating-type magnetic recording medium for heat-assisted recording, comprising:
 a non-magnetic support; and
 a magnetic layer containing magnetic particles,
 wherein a coercive force Hc of the magnetic layer in a thickness direction at 25° C. is 4100 oersteds (Oe) or more,

TABLE 8

| | Type of magnetic powder | x/(2−x) | Hc (Oe) at 25° C. | Hc (Oe) at 55° C. | Hc (Oe) at 80° C. | Hc (Oe) at 45° C. | Hc (Oe) at 60° C. | Hc (Oe) at 70° C. |
|---|---|---|---|---|---|---|---|---|
| Ex. 1 | (A) | 0.54 | 5980 | 3600 | 1600 | 4400 | 3200 | 2380 |
| Ex. 2 | (B) | 0.82 | 5320 | 3040 | 1270 | 3800 | 2680 | 1980 |
| Ex. 3 | (C) | 0.46 | 5810 | 3700 | 1920 | 4450 | 3450 | 2680 |
| Ex. 4 | (D) | 0.16 | 4550 | 3340 | 2260 | 3750 | 3200 | 2690 |
| Ex. 5 | (E) | 0.21 | 4140 | 3000 | 1900 | 3390 | 2800 | 2380 |
| Comp. Ex. 1 | (F) | 1.00 | 4800 | 2650 | 1030 | 3400 | 2320 | 1650 |
| Comp. Ex. 2 | (G) | 0.19 | 4490 | 3920 | 3360 | 4150 | 3810 | 3580 |
| Comp. Ex. 3 | (H) | 0.21 | 4000 | 2930 | 1770 | 3400 | 2700 | 2330 |

TABLE 9

| | Temperature dependence of Hc of magnetic layer (Oe/° C.) | Output characteristics S/N ratio (dB) | Difference in S/N ratio before and after accelerated life testing (dB) |
|---|---|---|---|
| Example 1 | −62 | 2.9 | −0.6 |
| Example 2 | −64 | 2.7 | −0.7 |
| Example 3 | −57 | 2.4 | −0.3 |
| Example 4 | −35 | 2.3 | −0.5 |
| Example 5 | −32 | 2.0 | −0.4 |
| Comparative Example 1 | −67 | 2.1 | −2.8 |
| Comparative Example 2 | −19 | 0 | −0.2 |
| Comparative Example 3 | −29 | 1.7 | −0.6 | the coercive force Hc of the magnetic layer in the thickness direction at a temperature between 55° C. and 80° C. inclusive is not less than 1200 oersteds (Oe) and not more than 3700 oersteds (Oe),
 the magnetic particles comprise ε-iron oxide represented by a general composition formula $\varepsilon\text{-}M_xFe_{2-x}O_3$,
 in the general composition formula $\varepsilon\text{-}M_xFe_{2-x}O_3$, M represents one or more elements other than Fe, and
 in the general composition formula $\varepsilon\text{-}M_xFe_{2-x}O_3$, in a case where a molar ratio between M and Fe is represented by x/(2−x), the following relationships (1) to (3) are satisfied:
 (1) $0.4 \leq x/(2-x) \leq 0.9$ is satisfied in a case where M represents a single element of Ga;
 (2) $0.1 \leq x/(2-x) \leq 0.18$ is satisfied in a case where M represents three elements of Ti, Co, and Al; and
 (3) $0.1 \leq x/(2-x) \leq 0.30$ is satisfied in a case where M represents three elements of Ti, Co, and Ga.

2. The coating-type magnetic recording medium according to claim 1, wherein
the coercive force Hc of the magnetic layer in the thickness direction at 25° C. is 4500 oersteds (Oe) or more, and the coercive force Hc of the magnetic layer in the thickness direction at a temperature between 60° C. and 70° C. inclusive is not less than 1900 oersteds (Oe) and not more than 3500 oersteds (Oe).

3. The coating-type magnetic recording medium according to claim 1, wherein
the coercive force Hc of the magnetic layer in the thickness direction at 25° C. is 10,000 oersteds (Oe) or less.

4. The coating-type magnetic recording medium according to claim 1, wherein
a temperature dependence of the coercive force Hc of the magnetic layer in the thickness direction is −30 oersteds (Oe)/° C. or less.

5. The coating-type magnetic recording medium according to claim 1, further comprising an undercoat layer between the non-magnetic support and the magnetic layer,
wherein the undercoat layer is in direct contact with the magnetic layer.

6. The coating-type magnetic recording medium according to claim 1, wherein
recording and reproduction are performed at a surface recording density of 15 Gb/in$^2$ or more.

7. The coating-type magnetic recording medium according to claim 1, having an overall thickness of 5.0 μm or less.

8. A heat-assisted magnetic recording apparatus comprising:
the coating-type magnetic recording medium according to claim 1; and
a magnetic recording head for heat-assisted recording.

9. A heat-assisted magnetic recording method comprising:
performing heat-assisted recording by heating the coating-type magnetic recording medium according to claim 1.

10. The heat-assisted magnetic recording method according to claim 9, wherein
a recording portion of the magnetic layer in the coating-type magnetic recording medium is heated to a temperature between 55° C. and 80° C. inclusive.

11. The heat-assisted magnetic recording method according to claim 9, wherein
a recording portion of the magnetic layer in the coating-type magnetic recording medium is heated to a temperature between 60° C. and 70° C. inclusive.

* * * * *